United States Patent
Kenington

(10) Patent No.: US 8,855,586 B2
(45) Date of Patent: Oct. 7, 2014

(54) ACTIVE ANTENNA ARRAY AND METHOD FOR TRANSMITTING RADIO SIGNAL

(75) Inventor: Peter Kenington, Chepstow (GB)

(73) Assignee: Kathrein-Werke KG, Rosenheim (DE)

( * ) Notice: Subject to any disclaimer, the term of this patent is extended or adjusted under 35 U.S.C. 154(b) by 0 days.

(21) Appl. No.: 13/437,435

(22) Filed: Apr. 2, 2012

(65) Prior Publication Data

US 2013/0260702 A1 Oct. 3, 2013

(51) Int. Cl.
*H04B 1/04* (2006.01)
*H04B 17/00* (2006.01)

(52) U.S. Cl.
CPC . *H04B 1/04* (2013.01); *H04B 17/00* (2013.01)
USPC .................... 455/115.1; 455/127.2

(58) Field of Classification Search
CPC ............ H04B 1/00; H04B 1/02; H04B 1/005; H04B 1/04; H04B 1/62; H04B 17/00
USPC ............ 455/422.1, 429, 67.11, 73, 550.1, 91, 455/115.1, 127.1, 127.2, 127.4
See application file for complete search history.

(56) References Cited

U.S. PATENT DOCUMENTS

| | | | | |
|---|---|---|---|---|
| 7,236,745 B2 * | 6/2007 | Wells et al. | ................. | 455/67.11 |
| 2002/0168974 A1 * | 11/2002 | Rosen et al. | ................... | 455/429 |
| 2007/0032201 A1 * | 2/2007 | Behzad et al. | ............. | 455/127.2 |
| 2011/0032158 A1 | 2/2011 | Rodger et al. | | |
| 2011/0250928 A1 * | 10/2011 | Schlub et al. | ............... | 455/550.1 |

* cited by examiner

*Primary Examiner* — Thanh Le
(74) *Attorney, Agent, or Firm* — Stephen H. Eland; Dann, Dorfman, Herrell & Skillman

(57) ABSTRACT

An active antenna array (10) for transmitting radio signals is disclosed. The active antenna array comprises a heat dissipating body (20), at least one first power amplifier (30) in thermal contact with the heat dissipating body (20), at least one second power amplifier (40) in thermal contact with the heat dissipating body (20) and an power level controller (50) for adjusting relative power levels of a first output signal (32) emanating from the at least one first power amplifier (30) and a second output signal (42) emanating from the at least one second power amplifier (40). A method for the transmission of radio signal is also disclosed.

11 Claims, 3 Drawing Sheets

ACTIVE ANTENNA ARRAY AND METHOD FOR TRANSMITTING RADIO SIGNAL

FIELD OF THE INVENTION

The disclosure relates to an active antenna array with a heat dissipating body. The disclosure further relates to a method for transmitting radio signals from the active antenna array.

BACKGROUND OF THE INVENTION

The use of mobile communications networks has increased over the last decade. Operators of the mobile communications networks have increased the number of base stations in order to meet an increased demand for service by users of the mobile communications networks. The operators of the mobile communications network wish to reduce the running costs of the base station. One option to do this is to implement a radio system as an antenna-embedded radio forming an active antenna array. Many of the components of the antenna-embedded radio may be implemented on one or more chips.

Nowadays active antenna arrays are used in the field of mobile communications systems in order to reduce power transmitted to a handset of a customer and thereby increase the efficiency of the base transceiver station, i.e. the radio station. The radio station typically comprises a plurality of antenna elements, i.e. an antenna array adapted for transceiving a payload signal. Typically the radio station comprises a plurality of transmit paths and receive paths. Each of the transmit paths and receive paths are terminated by one of the antenna elements.

The active antenna array or active antenna system is typically mounted on a mast or tower. The active antenna array is coupled to the base transceiver station (BTS) by means of a fibre optics cable and a power cable. The base transceiver station is coupled to a fixed line telecommunications network operated by one or more of the operators.

Equipment at the base of the mast as well as the active antenna array mounted on the mast is configured to transmit and receive radio signals within limits set by communication standards.

The code sharing and time division strategies rely on the radio station and the active antenna array to transmit and receive within limits set by communication standards. The communications standards typically provide a plurality of channels or frequency bands useable for an uplink communication from the handset to the radio station as well as for a downlink communication from the radio station to the subscriber device.

For example, the communication standard "Global System for Mobile Communications (GSM)" for mobile communications uses different frequencies in different regions. In North America, GSM operates on the primary mobile communication bands 850 MHz and 1900 MHz. In Europe, Middle East and Asia most of the providers use 900 MHz and 1800 MHz bands.

The operators have expressed a desire for an active antenna array that is able to utilise the existing base-station investments, in addition to providing services in a new frequency band. For example, in roll-out of long term evolution (LTE) at 700 MHz (US) or 800 MHz (EU), the operators would like to deploy a single antenna at the masthead which could transmit the existing 900 MHz (EU) or 850 MHz (US) GSM signals, using equipment at the base of the mast, as well as providing active antenna functionality for the new LTE installation.

One issue relating to adaptive antenna arrays is the inefficiency of the power amplifiers commonly used in the adaptive antenna arrays. The power amplifiers typically convert 20-40% of the power fed to them into radio signals. The rest, that is 60-80% of the power fed to the power amplifiers, is converted into heat and has to be dissipated. Failure to dissipate the heat will cause the power amplifiers to overheat, either resulting in an immediate failure or in a significant reduction of their lifespan.

The heat produced in the power amplifiers is dissipated by heat sinks. These heat sinks, together with their associated power amplifiers, are mounted on top of the mast, in the case of both active antennas and remote radio heads. In adaptive antenna arrays with a single frequency band, the heat sinks have a considerable size and weight. This weight adds a load on a mast of the radio station that the mast needs to be able to carry. Furthermore the heat sinks and associated power amplifiers, transceivers etc. also have to be transported to the top of the mast. This is not a trivial task and can require the use of cranes or 'cherry pickers', which are expensive to hire for the network operator. The operator does not, therefore, want to have to revisit the site regularly to remove faulty antenna systems from the masthead. One example of the heat sink used in an antenna is shown in US Patent Application Publication No US 2011/0032158 (Rodger et al, assigned to Andrew LLC).

The size and the weight of the heat sink capable of dissipating the heat generated by the power amplifiers required for two frequency bands, at the output levels desired by operators, is large. To date no such a heat sink is known to have been deployed at most existing base transceiver stations due to weight and size considerations.

SUMMARY OF THE INVENTION

An active antenna array is taught in this disclosure. The active antenna array has a heat dissipating body, at least one first power amplifier in thermal contact with the heat dissipating body, at least one second power amplifier in thermal contact with the heat dissipating body and a power level controller for adjusting relative power levels of a first output signal emanating from the at least one first power amplifier and a second output signal emanating from the at least one second power amplifier. The heat dissipating body (which term also includes a heat sink) is shared by the two (or more) groups of power amplifiers. The power level controller adjusts the relative power levels of the first output signal emanating from the first power amplifiers and the second output signal emanating from the second power amplifiers, so as to control the amount of heat produced in the two groups of power amplifiers that is dissipated to the heat dissipating body.

In one aspect of the invention, the first power amplifiers and the second power amplifiers work in different frequency bands and so the first output signal and the second output signal are at different frequencies.

Depending on the temperatures of the heat dissipating body, the first power amplifiers and the second power amplifiers can be run at full output power for certain periods of time. In practice, however, it often is sufficient to run one or both groups of power amplifiers at a power output level below the maximum power output level.

The active antenna array enables a process of passive cooling of the active antenna array as opposed to active cooling. Active cooling of the active antenna array is not the process of choice due to maintenance as well as reliability reasons. Methods of active cooling of the array include the use of fans to force air over the fins of the heat sink. Such fans need to operate outdoors, at the masthead, in a variety of severe weather conditions. Such a harsh environment leads to poor reliability of electromechanical components, such as fans and their associated motors.

A method for transmitting radio signals is also disclosed in this document. This method comprises the steps of amplifying at least one first input signal, amplifying at least one second input signal, and adjusting relative amounts of the amplifying of the at least one first input signal and the amplifying of the at least one second input signal, so as to control the heat produced in the at least one first power amplifier and the at least one second power amplifier.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

The term "base transceiver station (BTS)" in the context of this disclosure includes, but is not limited to, base stations, as known from GSM networks, as well as a node B (known from UMTS/3G networks) or enhanced node B, and similar units used in other mobile communication networks.

Figure 1:
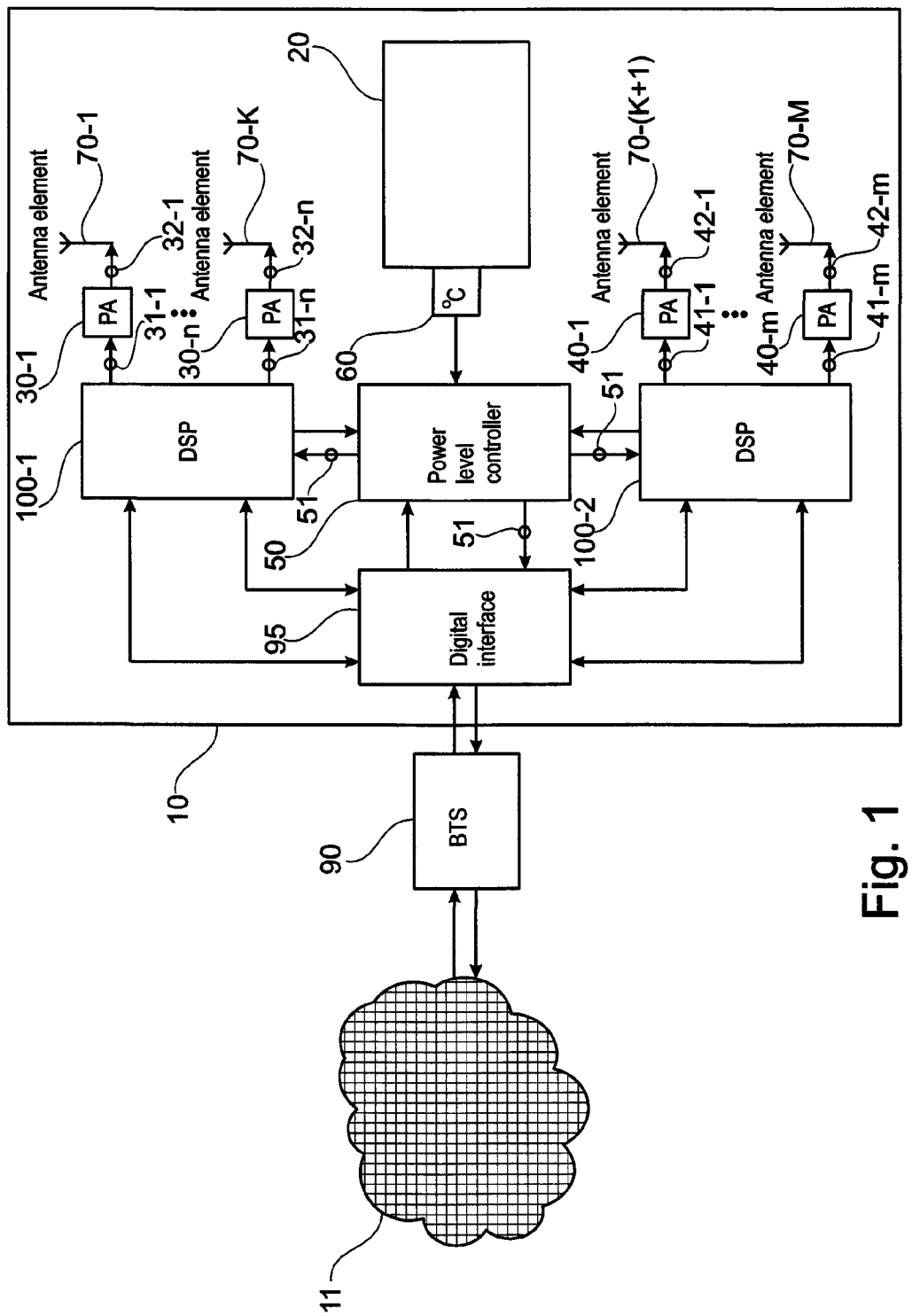
FIG. 1 shows an outline of a system according to one aspect of this disclosure

As shown in FIG. 1, an active antenna array 10 is connected to a base transceiver station 90. The base transceiver station 90 connects the active antenna array 10 to a terrestrial fixed-line communications network 11. It is possible to connect the base transceiver station 90 to a terrestrial fixed-line communications network 11 by a variety of means. Such means include (but are not limited to): fibre optic cables, twisted pair, coaxial or other copper cables, microwave point-to-point links and wireless 'mesh' network solutions.

The active antenna array 10 further comprises a plurality of first power amplifiers 30-1, ..., 30-n and a plurality of second power amplifiers 40-1, ..., 40-m. The plurality of first power amplifiers 30-1, ..., 30-n amplifies first input signals 31-1, ..., 31-n transferred from the base transceiver station 90 to the plurality of first power amplifiers 30-1, ..., 30-n and outputs first output signals 32-1, ..., 32-n. The plurality of second power amplifiers 40-1, ..., 40-m amplifies second input signals 41-1, ..., 41-m transferred from the base transceiver station 90 to the plurality of second power amplifiers 40-1, ..., 40-m and outputs second output signals 42-1, ..., 42-m.

The plurality of first power amplifiers 30-1, ..., 30-n amplify the first transmit signals 31-1, ..., 31-n in a first frequency band, and the plurality of second power amplifiers amplify the second transmit signals 41-1, ..., 41-m in a second frequency band. The active antenna array 10 is then termed a dual band active antenna array. Likewise tri-band active antenna arrays and quad-band active antenna arrays are conceivable with different ones of the first power amplifiers 30-1, ..., 30-n and the second power amplifiers 40-1, ..., 40-m operating in different bands.

The amplification of the first transmit signals 31-1, ..., 31-n in the plurality of first power amplifiers 30-1, ..., 30-n and the amplification of the second transmit signals 41-1, ..., 41-m in the plurality of second power amplifiers 40-1, ..., 40-m produces heat. The inherent inefficiency of the first power amplifiers 30-1, ..., 30-n and the second power amplifiers 40-1, ..., 40-m is a known issue in the active antenna arrays. The heat produced needs to be dissipated away in order protect the first power amplifiers 30-1, ..., 30-n and the second power amplifiers 40-1, ..., 40-m from overheating. This is done using a heat dissipating device 20.

The active antenna array 10 further comprises a plurality of antenna elements 70-1, ..., 70-K, 70-(K+1), ..., 70-M. FIG. 1 shows a single one of the plurality of antenna elements 70-1, ..., 70-K, 70-(K+1), ..., 70-M connected to a single one of the plurality of first power amplifiers 30-1, ..., 30-n or to a single one of the plurality of second power amplifiers 40-1, ..., 40-m. It is conceivable that more than one of the antenna elements 70-1, ..., 70-K, 70-(K+1), ..., 70-M are connected to a single one of the first power amplifiers 30-1, ..., 30-n or to a single one of the second power amplifiers 40-1, ..., 40-m.

The plurality of antenna elements 70-1, ..., 70-K, 70-(K+1), ..., 70-M transmit the first transmit signals 31-1, ..., 31-n amplified by the plurality of first power amplifiers 30-1, ..., 30-n and the second transmit signals 41-1, ..., 41-m amplified by the plurality of second power amplifiers 40-1, ..., 40-m.

The active antenna array 10 further comprises digital signal processors (DSPs) 100-1 and 100-2. FIG. 1 shows a first digital signal processor 100-1 connected to the plurality of first power amplifiers 30-1, ..., 30-n and a second digital signal processor 100-2 connected to the plurality of second power amplifiers 40-1, ..., 40-m. It is conceivable that a single one of the digital signal processor 100 would be connected to both the first power amplifiers 30-1, ..., 30-n and the second power amplifiers 40-1, ..., 40-m. It is equally conceivable that more than one of the digital signal processors 100-1 or 100-2 be connected to the first power amplifiers 30-1, ..., 30-n, or to the second power amplifiers 40-1, ..., 40-n.

As shown in FIG. 1, the active antenna array 10 further comprises a digital interface 95. Any transmit signal, such as the first transmit signals 31-1, ..., 31-n and the second transmit signals 41-1, ..., 41-m, transferred from the base transceiver station 90 to the antenna elements 70-1, ..., 70-K, 70-(K+1), ..., 70-M, and any signal transferred from the antenna elements 70-1, ..., 70-K, 70-(K+1), ..., 70-M to the base transceiver station 90 passes through the digital interface 95. The base transceiver station 90 typically undertakes the processes of modulation and demodulation of carrier signals transmitted by, and received from, the antenna elements 70-1, ..., 70-K, 70-(K+1), ..., 70-M.

Figure 2:
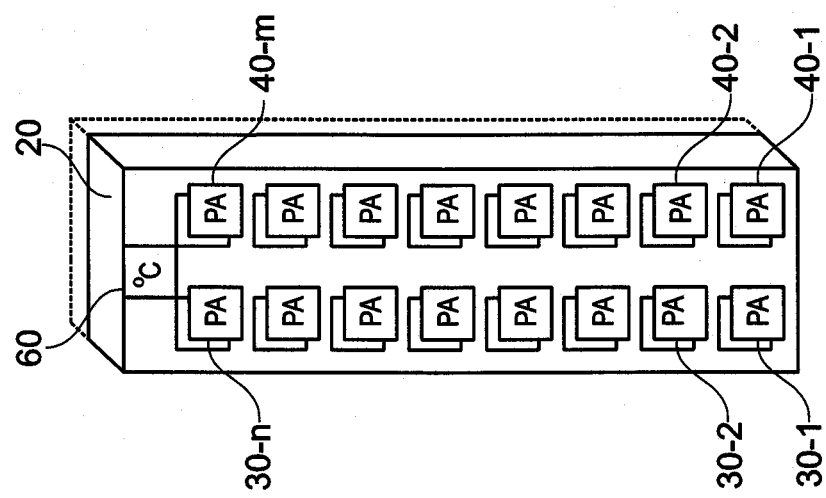
FIG. 2 shows an embodiment of an active antenna array

The heat dissipating body 20 is shown in more detail in FIG. 2 and is in thermal contact with the first power amplifiers 30-1, ..., 30-n and the second power amplifiers 40-1, ..., 40-m. The heat dissipating body 20 accommodates heat generated in the first power amplifiers 30-1, ..., 30-n and second power amplifiers 40-1, ..., 40-m and to dissipate the accommodated heat to the environment surrounding the heat dissipating body 20.

The extent of conduction of the heat from the first power amplifiers 30-1, ..., 30-n and the second power amplifiers 40-1, ..., 40-m to the heat dissipating body 20 through the thermal contacts depends on several factors. These several factors include difference of temperatures of the plurality of first power amplifiers 30-1, ..., 30-n as well as the plurality of second power amplifiers **40-1, . . . , 40-*m* and temperature of the heat dissipating body 20. The several factors further include a thermal conductance of the thermal contacts between the heat dissipating body 20 and the first power amplifiers 30-1, . . . , 30-*n* as well as the plurality of second power amplifiers 40-1, . . . , 40-*m***.

The extent of dissipation of the heat accommodated by the heat dissipating body 20 to the surroundings of the heat dissipating body 20 depends on several factors. These several factors include difference of the temperature of the heat dissipating body 20 and a temperature of the surroundings of the heat dissipating body 20.

As shown in FIGS. 1 and 2, the active antenna array 10 further comprises a temperature sensor 60 for measuring the temperature of the heat dissipating body 20, and an power level controller 50. The temperature sensor 60 is adapted to transmit the temperature of the heat dissipating body 20 to the power level controller 50.

The power level controller 50 is adapted to adjust, i.e. increase or decrease, the relative power levels of the first output signals **32-1, . . . , 32-*n* emanating from the first power amplifiers 30-1, . . . , 30-*n* and the second output signals 42-1, . . . , 42-*m* emanating from the second power amplifiers 40-1, . . . , 40-*m*, such that the temperatures of the first power amplifiers 30-1, . . . , 30-*n* and the second power amplifiers 40-1, . . . , 40-*m*** do not exceed a safe operating level and therefore result in the amplifiers being damaged.

The power level controller 50 monitors both the relative power levels of the first output signals **32-1, . . . , 32-*n* emanating from the first power amplifiers 30-1, . . . , 30-*n* and the second output signals 42-1, . . . , 42-*m* emanating from the second power amplifiers 40-1, . . . , 40-*m*, and the temperature of the heat dissipating body 20. The power level controller 50 then calculates the changes in the relative power levels of the first output signals 32-1, . . . , 32-*n* that should be emanating from the first power amplifiers 30-1, . . . , 30-*n* and of the second output signals 42-1, . . . , 42-*m* that should be emanating from the second power amplifiers 40-1, . . . , 40-*m*, and generates a control signal 51**.

The power level controller 50 transmits the control signal 51 to at least one of the base transceiver station 90 and the digital signal processors 100-1 or 100-2. Either the base transceiver station 90 or the digital signal processors 100-1 or 100-2 effects the changes in the power levels of the first output signals **32-1, . . . , 32-*n* emanating from the first power amplifiers 30-1, . . . , 30-*n* and the second output signals 42-1, . . . , 42-*m* emanating from the second power amplifiers 40-1, . . . , 40-*m*, according to the control signal 51**.

There are a number of methods known in the art by which the base transceiver station 90 or the digital signal processors 100-1 or 100-2 can effect the changes in the relative power levels of the first output signals **32-1, . . . , 32-*n* emanating from the first power amplifiers 30-1, . . . , 30-*n* and the second output signals 42-1, . . . , 42-*m* emanating from the second power amplifiers 40-1, . . . , 40-*m*, according to the control signal 51. For example, the base transceiver station 90 or the digital signal processors 100-1 or 100-2 can reduce the relative power levels of the input signals 31-1, . . . , 31-*n*, 41-1, . . . , 41-*m* by an appropriate amount to effect the required reduction in the relative power levels of the output signals 32-1, . . . , 32-*n*, 42-1, . . . , 42-*m*. Since the first power amplifiers 30-1, . . . , 30-*n* and the second power amplifiers 40-1, . . . , 40-*m* are typically linear power amplifiers or linearised power amplifiers, a reduction of X decibels in the power levels of the input signals 31-1, . . . , 31-*n*, 41-1, . . . , 41-*m* will result in a corresponding reduction of X decibels in the power levels of output signals 32-1, . . . , 32-*n*, 42-1, . . . , 42-*m*. This will, typically, also reduce the heat produced by the first power amplifiers 30-1, . . . , 30-*n* and the second power amplifiers 40-1, . . . , 40-*m*** by a known amount, assuming that a known change in input power level is made to some or all of the power amplifiers. In some classes of linear power amplifier, for example class-A power amplifiers, little or no power dissipation reduction would result from a reduction in input power. However, such classes of amplifier are typically not used in active antenna array applications due to their poor power efficiency and high heat dissipation requirements.

In another aspect, gains of the plurality of first power amplifiers **30-1, . . . , 30-*n* and the plurality of second power amplifiers 40-1, . . . , 40-*m* are changed by means of a control voltage or a control current applied to a control pin of a variable gain amplifier (VGA) stage forming a part of an amplifier line-up (not shown in FIG. 1) for the plurality of first power amplifiers 30-1, . . . , 30-*n* and the plurality of second power amplifiers 40-1, . . . , 40-*m*. Such variable gain amplifier stages may be fabricated as low-power integrated circuits or may be formed from a number of discrete components, as is known in the art. Varying the gain of the plurality of first power amplifiers 30-1, . . . , 30-*n* and the plurality of second power amplifiers 40-1, . . . , 40-*m* will vary the relative power levels of the first output signals 32-1, . . . , 32-*n* emanating from the first power amplifiers 30-1, . . . , 30-*n* and the second output signals 42-1, . . . , 42-*m* emanating from the second power amplifiers 40-1, . . . , 40-*m*. In this way, reducing the gain can be used as a means of reducing the heat generated by the plurality of first power amplifiers 30-1, . . . , 30-*n* and the plurality of second power amplifiers 40-1, . . . , 40-*m***.

In a further aspect, the relative power levels of the first output signals **32-1, . . . , 32-*n* emanating from the first power amplifiers 30-1, . . . , 30-*n* and the second output signals 42-1, . . . , 42-*m* emanating from the second power amplifiers 40-1, . . . , 40-*m* may be adjusted by changing the power supplied by a power supply feeding power to the plurality of first power amplifiers 30-1, . . . , 30-*n* and the plurality of second power amplifiers 40-1, . . . , 40-*m*, implemented either as a change in the power supply voltage or a change in the power supply current or both in response to the control signal 51. Such controlled power supplies are used, for example, in envelope tracking systems employed in base-station transceiver systems and are well known in the art There are other methods of adjusting the gain of a power amplifier, such as changing a bias fed to a gate or base of active amplifying devices employed in the amplifier. All such methods are potentially appropriate for meeting the requirement of this invention to provide the required change in the relative power levels of the first output signals 32-1, . . . , 32-*n* emanating from the first power amplifiers 30-1, . . . , 30-*n* and the second output signals 42-1, . . . , 42-*m* emanating from the second power amplifiers 40-1, . . . , 40-*m***, and consequently the heat dissipation required by the said amplifiers.

It is conceivable that the heat dissipating body 20 has a size and a heat capacity such that the heat dissipating body 20 would temporarily be capable of dissipating the heat produced in the at least one first power amplifier 30 and the at least one second power amplifier 40 both running at full output power. Once the temperature of the heat dissipating body 20 rises above a threshold value, the power level controller 50 transmits the control signal 51 to one of or both the base transceiver station 90 and the digital signal processors 100-1 or 100-2 indicating instructions to decrease the output power levels emanating from one of or several of the plurality of first power amplifiers **30-1, . . . , 30-*n* and the plurality of second power amplifiers 40-1, . . . , 40-*m***.

Figure 3:
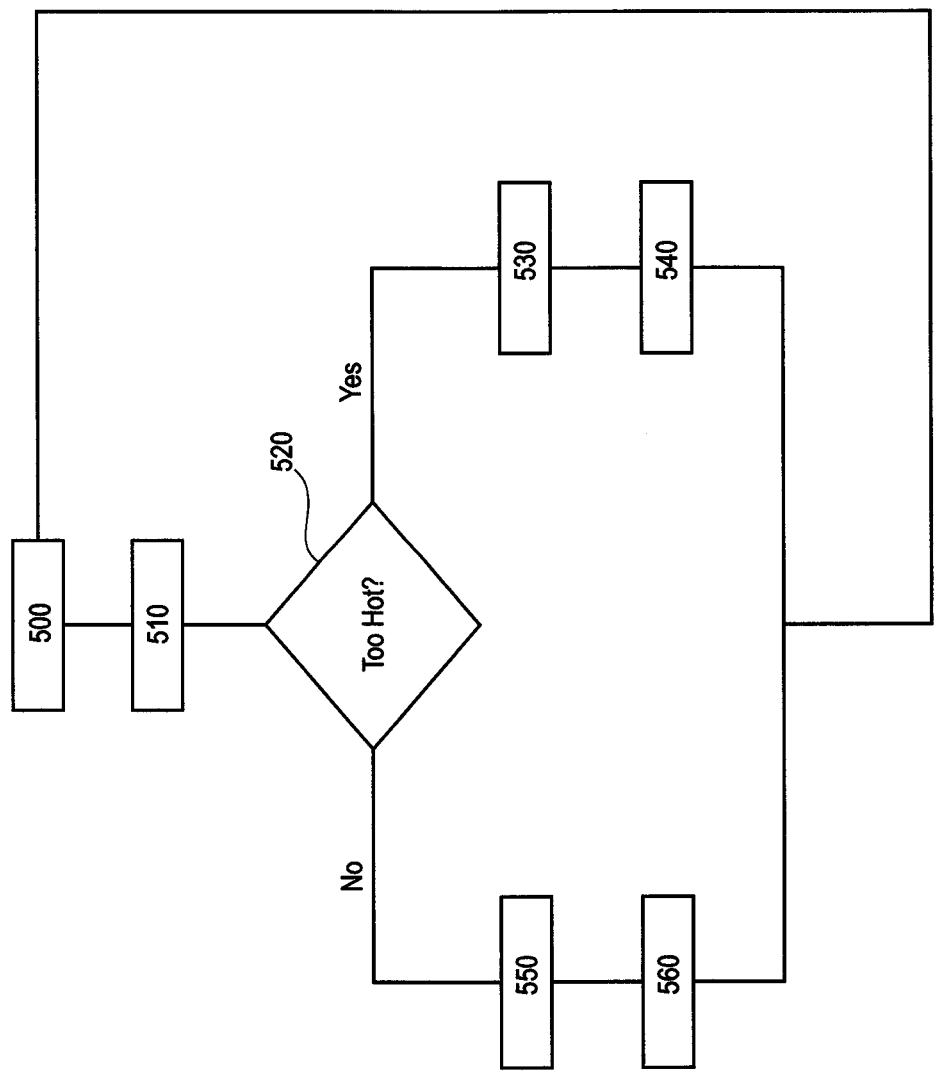
FIG. 3 shows a flow diagram of a method of operation of the active antenna array

A method for adjusting relative amounts of amplifying of the first input signal 31 at the at least one first power amplifier 30 and the second input signal 41 at the at least one second power amplifier 40 is shown in FIG. 3.

A step 500 comprises measuring and transmitting the temperature data of the heat dissipating body 20 to the power level controller 50. The temperature sensor 60 measures the temperature of the heat dissipating body 20.

A step 510 comprises monitoring both the relative power levels of the first output signals 32-1, . . . , 32-n emanating from the first power amplifiers 30-1, . . . , 30-n and the second output signals 42-1, . . . , 42-m emanating from the second power amplifiers 40-1, . . . , 40-m.

A decision is made at step 520 of whether the heat dissipating body 20 is too hot and there is thus a potential risk of overheating of plurality of first power amplifiers 30-1, . . . , 30-n and the plurality of second power amplifiers 40-1, . . . , 40-m. If this is the case, then a control signal 51 is sent at step 530 by the power level controller 50 to one of or both the base transceiver station 90 and the digital signal processors 100-1 and 100-2. The control signal 51 then indicates the relative amounts by which the power levels of the first output signals 32-1, . . . , 32-n emanating from the first power amplifiers 30-1, . . . , 30-n and the second output signals 42-1, . . . , 42-m emanating from the second power amplifiers 40-1, . . . , 40-m need to be decreased.

In a step 540 the relative power levels of the first output signals 32-1, . . . , 32-n emanating from the first power amplifiers 30-1, . . . , 30-n and the second output signals 42-1, . . . , 42-m emanating from the second power amplifiers 40-1, . . . , 40-m are reduced, according to the control signal 51 sent at step 530 by the power level controller 50. Note that it is possible that the power levels of the first output signals 32-1, . . . , 32-n emanating from the first power amplifiers 30-1, . . . , 30-n could remain unchanged whilst the power levels of the second output signals 42-1, . . . , 42-m emanating from the second power amplifiers 40-1, . . . , 40-n is reduced (or vice-versa). This would be the case in the event that power levels needed to be maintained in one of the frequency bands (served by the plurality of first power amplifiers 30-1, . . . , 30-n) whilst sacrificing power levels (and coverage) in the plurality of second power amplifiers 40-1, . . . 30-n. The loop then returns to the first step 500 and the temperature of the heat dissipating body 20 is monitored.

If, on the other hand, the temperature of the heat dissipating body 20 is not above the threshold level, then the power can be increased in step 550. This can be the case when, for example, the temperature of the environment surrounding the heat dissipating body 20 is lower than that stipulated as the maximum for the specified output power rating of the active antenna array. The control signal 51 is then sent to one of or both the base transceiver station 90 and the digital signal processor 100-1 and 100-2 in step 560. The control signal 51 indicates that the relative power levels of the first output signals 32-1, . . . , 32-n emanating from the first power amplifiers 30-1, . . . , 30-n and the second output signals 42-1, . . . , 42-m emanating from the second power amplifiers 40-1, . . . , 40-m may be increased. The loop returns to step 500.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a central processing unit ("CPU"), micro processor, micro controller, digital signal processor, processor core, system on chip ("SOC") or any other device), implementations may also be embodied in software (e.g. computer readable code, program code, and/or instructions disposed in any form, such as source, object or machine language) disposed for example in a computer useable (e.g. readable) medium configured to store the software. Such software can enable, for example, the function, fabrication, modelling, simulation, description and/or testing of the apparatus and methods describe herein. For example, this can be accomplished through the use of general program languages (e.g., C, C++), hardware description languages (HDL) including Verilog HDL, VHDL, a layout description language (GDS, GDS II, Gerber, . . . ), a circuit description language (Spice) and so on, or other available programs. Such software can be disposed in any known computer useable medium such as semiconductor, magnetic disc, or optical disc (e.g., CD-ROM, DVD-ROM, etc.). The software can also be disposed as a computer data signal embodied in a computer useable (e.g. readable) transmission medium (e.g., carrier wave or any other medium including digital, optical, analogue-based medium). Embodiments of the present invention may include methods of providing the apparatus described herein by providing software describing the apparatus and subsequently transmitting the software as a computer data signal over a communication network including the internet and intranets.

It is understood that at least part of the apparatus and method describe herein may be included in a semiconductor intellectual property core, such as a micro processor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

| List of reference numbers | |
|---|---|
| 10 | Active antenna array |
| 11 | Terrestrial telecommunication network |
| 20 | Heat dissipating body |
| 30 | First power amplifier |
| 31 | First input signals |
| 32 | First output signals |
| 40 | Second power amplifier |
| 41 | Second input signals |
| 42 | Second output signals |
| 50 | Power level controller |
| 51 | Control signal |
| 60 | Temperature sensor |
| 70 | Antenna elements |
| 90 | Base transceiver station |
| 95 | Digital interface |
| 100 | Digital signal processor |

The invention claimed is:

1. An active antenna array for transceiving signals from a base transceiver station, wherein the active antenna array comprises:
   a heat dissipating body;
   at least one first power amplifier in thermal contact with the heat dissipating body, wherein the first power amplifier amplifies a first input signal from the base transceiver station;
   at least one second power amplifier in thermal contact with the heat dissipating body, wherein the at least one second power amplifier amplifies a second input signal from the base transceiver station;

wherein the at least one first power amplifier is adapted to operate in a first frequency band and the at least one second power amplifier is adapted to operate in a second frequency band; and a power level controller for adjusting relative power levels of a first output signal emanating from the at least one first power amplifier and a second output signal emanating from the at least one second power amplifier.

2. The active antenna array according to claim 1, further comprising a plurality of antenna elements connected to one of the at least one first power amplifier and the at least one second power amplifier.

3. The active antenna array according to claim 1, further comprising
a temperature sensor for measuring the temperature of the heat dissipating body and for transmitting temperature data to the power level controller.

4. The active antenna array according to claim 1, connected to the base transceiver station for receiving control signals from the power level controller pertaining to the relative power levels of the first output signal emanating from the at least one first power amplifier and the second output signal emanating from the at least one second power amplifier.

5. The active antenna array according to claim 1, further comprising
at least one digital signal processor for receiving control signals from the power level controller pertaining to the relative power levels of the first output signal emanating from the at least one first power amplifier and the second output signal emanating from the at least one second power amplifier.

6. A method for transceiving radio signals from a base transceiver station comprising the steps of:
amplifying at least one first input signal received from the base transceiver station;
amplifying at least one second input signal received from the base transceiver station;
wherein the at least one first input signal is in a first frequency band and the at least one second input signal is in a second frequency band;
adjusting relative amounts of the amplifying of the at least one first input signal and the amplifying of the at least one second input signal, so as to control the heat produced in the at least one first power amplifier and the at least one second power amplifier.

7. The method according to the claim 6, further comprising transmitting temperature data of a heat dissipating body to the power level controller.

8. The method according to claim 6, further comprising transmitting control signals governing the adjusting of relative amounts of the amplifying of the at least one first input signal and the amplifying of the at least one second input signal, so as to control the heat produced in the at least one first power amplifier and the at least one second power amplifier.

9. The method according to claim 6, further comprising transmitting status signals pertaining to the amplifying of the at least one first input signal and the amplifying of the at least one second input signal.

10. A non-transitory computer-readable medium comprising a computer program for a base transceiver station and having
first logic for amplifying at least one first input signal in a first frequency band from a base transceiver station;
second logic for amplifying at least one second input signal in a second frequency band from a base transceiver station; and
third logic for adjusting relative amounts of the amplifying of the at least one first input signal and the amplifying of the at least one second input signal, so as to control the heat produced in the at least one first power amplifier and the at least one second power amplifier.

11. The active antenna array of claim 1, wherein the base transceiver station is connected to a terrestrial fixed-line communications network.

* * * * *